April 23, 1968     J. G. BREEDLOVE     3,379,943
MULTILAYERED ELECTRICAL CAPACITOR
Filed Jan. 17, 1966     2 Sheets-Sheet 1
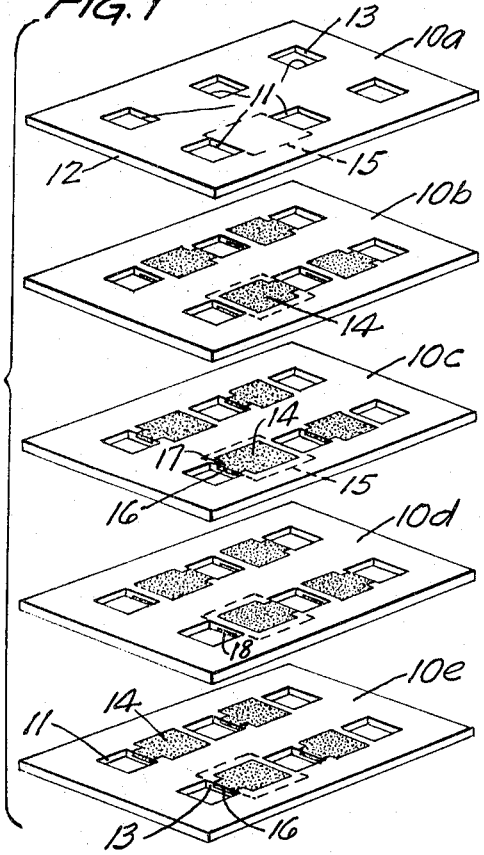
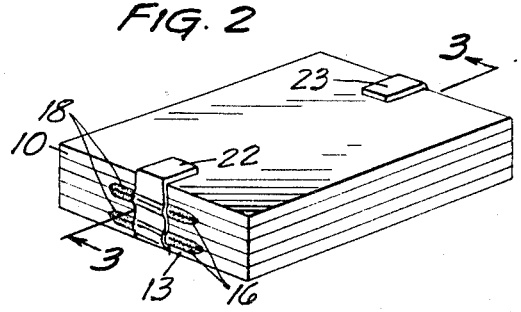
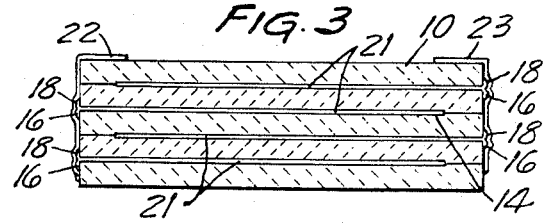
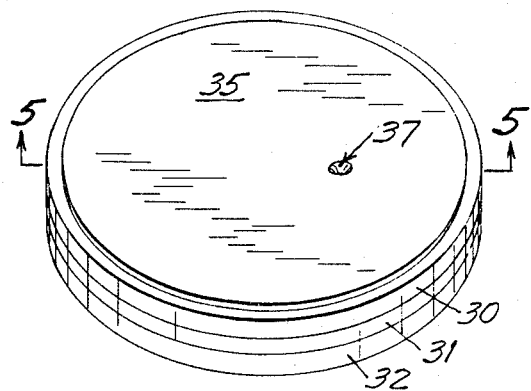
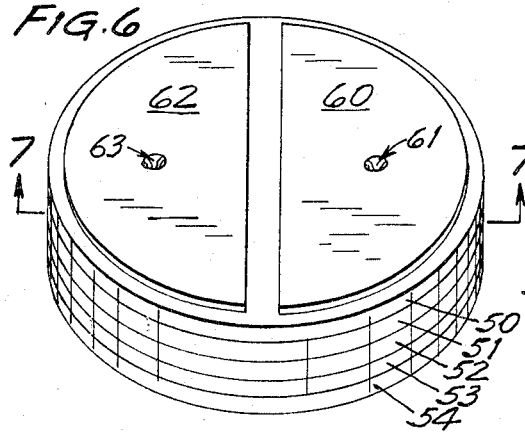
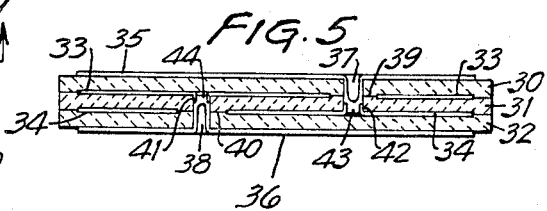
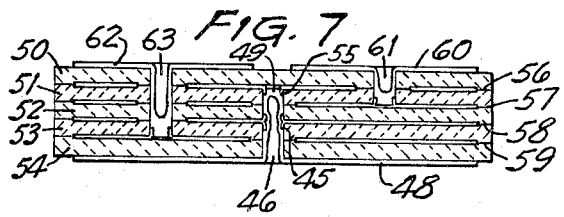
INVENTOR.
JAMES G. BREEDLOVE
BY
Carpenter, Kinney & Coulter
ATTORNEYS

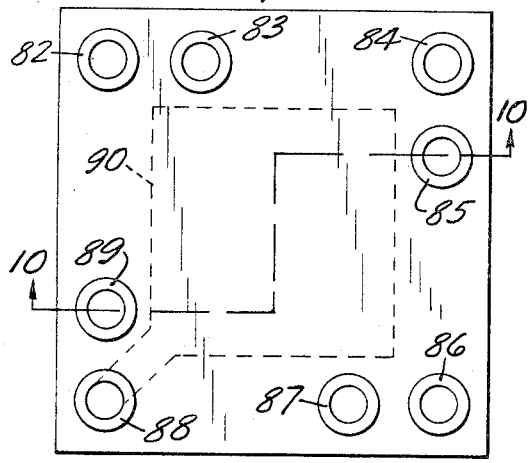
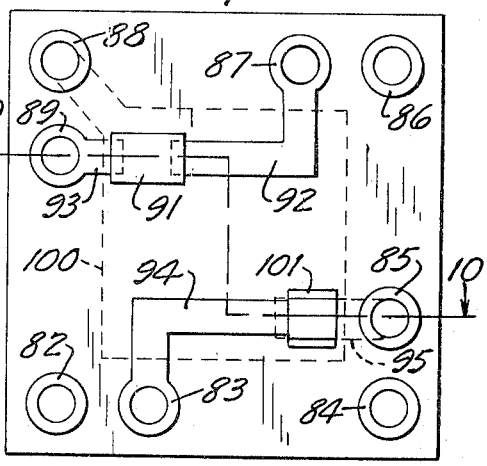
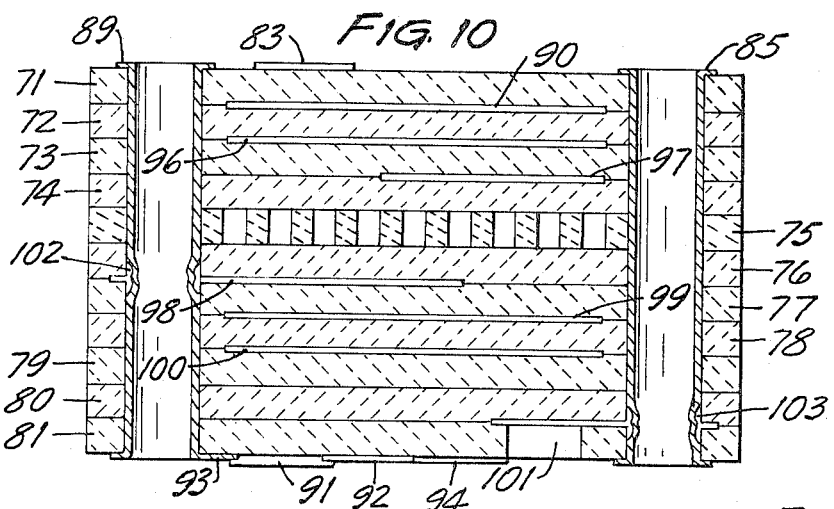
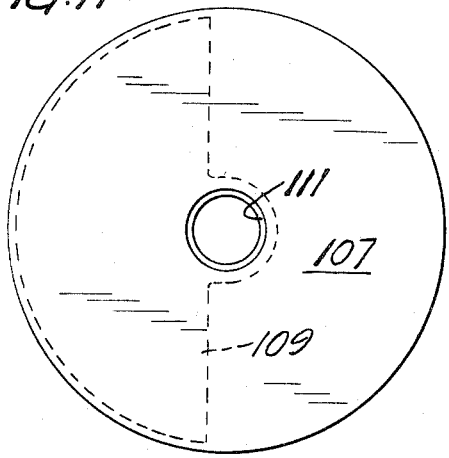
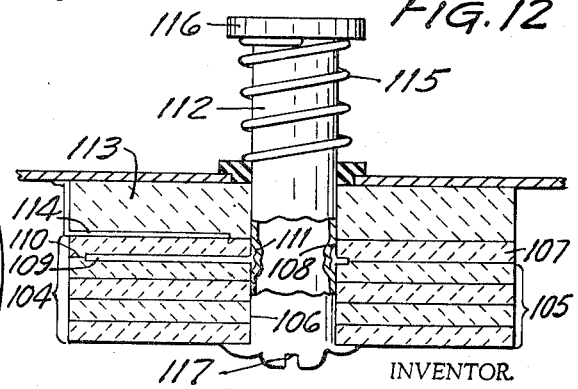
INVENTOR.
JAMES G. BREEDLOVE
BY
Carpenter, Kinney & Coulter
ATTORNEYS

United States Patent Office 3,379,943
Patented Apr. 23, 1968

3,379,943
MULTILAYERED ELECTRICAL CAPACITOR
James G. Breedlove, Signal Mountain, Tenn., assignor to American Lava Corporation, Chattanooga, Tenn., a corporation of Tennessee
Filed Jan. 17, 1966, Ser. No. 521,183
17 Claims. (Cl. 317—258)

ABSTRACT OF THE DISCLOSURE

Specification discloses new monolithic sinter-unified electronic articles having at least two electrically-insulative layers of ceramic, usually three or more of such layers, with interleaved electrically-conductive material between various and selected electrically-insulative layers, and with specialized shapes or configurations for positive electrode connection between interleaved electrically-conductive material and outer terminal electrode material. An edge overlap structure or hole is shown for the positive electrical connection.

---

This invention relates to new highly reliable multilayer electronic structural articles, particularly those having at least one capacitor function or capacitor element, and a method for preparing the same.

The invention may be used to provide multilayer capacitors having improved electrical connections between spaced electrically-conductive metal layers and the terminal electrodes for those metal layers. It may be used to provide complex multilayer electronic elements or articles having two or more capacitors, with or without provisions for other circuit elements (e.g., conductive paths and active circuit elements such as resistors, transistors or diodes). Products of the invention are useful as electronic apparatus, or as components of electronic apparatus, particularly of the category generally described as a hybrid electronic apparatus.

Multilayer capacitors are, of course, known. However, multilayer capacitors have heretofore been formed usually by coating alternate layers of ceramic slip composition and metal slip composition, with drying of volatile liquid material from each deposited layer before applying the next. This leads to problems of liquid penetration of underlying layers and intermingling of the constituents of deposited layers. Further, shrinkage also is a problem simply because it occurs at every drying step in the preparation of the laminate, causing the laminate to curl or "keystone." Curling and intermingling of deposited constituents from different layers has heretofore been largely overcome by employing individual previously dried but unfired ceramic films or layers, depositing metal in a pattern on the dried films, compacting the metal coated films in a stack and cutting multilayer capacitors from the stack. But such a procedure still suffers from a defect common to the slip coating method in that the electrical connection between terminal electrodes and interleaved electrode patterns is essentially a line contact or less. This causes problems in that the line contact electrical connection is not always properly accomplished.

In brief, the build up of layers according to both the foregoing prior art methods is followed by shearing or cutting the edge portions of the layers in the laminate for the purpose of exposing interleaved electrode patterns for edge terminal electrode connection. Smearing of the ceramic insulator material during cutting the edges has been a recurring problem. Some manufacturers engage in cleaning steps, such as sandblasting the sheared or cut edges after firing the laminate, in an effort to expose the edges of the interleaved metal electrodes for proper terminal electrode connection. This expedient, however, does not uniformly result in electrically sound terminal electrode connections. Many times, even if a terminal connection appears to be satisfactorily accomplished under conditions of test at very low voltages and extremely low currents, failure occurs in practical use environments because the electrical connection between the line edge of interleaved electrodes and applied terminal electrodes is either infrequent, or only partial, or otherwise inadequate.

By utilizing the teaching of this invention, however, full electrical connection between interleaved electrodes and applied terminal electrodes may be accomplished with consistency in manufacture. A particular advantage flowing from this invention is that the lateral width of terminal electrode connectors across exposed edge-laminations of multilayer articles, such as a multilayer capacitor, may be reduced over what was necessary in the prior art without sacrifice or reliability of connection. Even when the lateral width or breadth of terminal electrode connectors is substantially reduced over that characteristic of the prior art, the area of interleaved electrode material exposed at lateral edge-lamination surface of articles formed according to the preferred embodiment of the invention is such that positive electrical contact between the terminal electrode and material of interleaved electrodes is accomplished.

Because of the positive electrical contact as taught herein, it is possible, for the first time as far as is known, to manufacture in a reliable manner certain complex multilayer electronic sinter-unified circuit elements having a number of functional characteristics (e.g. at least two and even several capacitors, with or without interaction between them, plus leads, resistors and the like). Relatively narrow electrical terminal electrodes may be placed in spaced but relatively close proximity across exposed edges or edge-laminations of a multilayer structure made according to the present teaching without sacrifice of positive, full electrical connection to interleaved electrodes or other electrically-conductive elements within the multilayer structure.

Another feature of the present invention is that terminal electrode connections to interleaved electrodes may may reliably be made within small recess holes or confined areas extending through two or more layers or even all of the multilayer laminate. The present invention affords a means for positive full electrical connection between terminals and interleaved electrodes when the terminals extend across exposed edge-laminations, whether in small holes, or on the outer lateral edges of the structure. Some embodiments of the invention rely upon terminal electrode contact with interleaved electrode material at the bottom of a hole in the article, whereas in others a special edge overlap structure of interleaved electrode material is employed for the contact.

A still further advantage of this invention is that outermost ceramic layers of a multilayer structure may be used as active elements of a capacitor.

Multilayer structures of this invention may take any desired shape, whether square, rectangular, round or oblong. They may have external grooves and internal recesses or holes extending partially or completely therethrough, as may be needed for specific functions as desired.

The invention will be described by reference to drawings made a part hereof wherein:

FIGURE 1 is an exploded sketch of one embodiment of the invention showing a series of dried but unfired electrically-insulative ceramic layers with selective portions removed and with the layers metalized with internal electrode patterns;

FIGURE 2 is a perspective sketch of a multilayer capacitor formed using a portion of the laminate of FIGURE 1;

FIGURE 3 is a cross-sectional view taken along the lines 3—3 of FIGURE 2, illustrating the edge overlap structure of internal electrode metal in the multilayer article;

FIGURE 4 is a perspective view of a disc capacitor having three electrically-insulative layers and formed according to another embodiment of the invention;

FIGURE 5 is a cross-sectional view taken along the lines of 5—5 of FIGURE 4 and illustrating the connection between terminal electrodes and interleaved internal electrodes in the multilayer structure;

FIGURE 6 is a perspective view of a two-capacitor monolithic article formed according to the invention;

FIGURE 7 is a cross-section taken on line 7—7 of FIGURE 6;

FIGURE 8 is a top plan view of a complex electronic monolithic article of the invention;

FIGURE 9 is a bottom view of the article of FIGURE 8;

FIGURE 10 is a cross-section along lines 10—10 of FIGURES 8 and 9.

FIGURE 11 is a top plan view of an element of a trimmer capacitor; and

FIGURE 12 is a sketch of a cross-sectional view of a trimmer capacitor with the element of FIGURE 11 shown in cross-section along line 12—12.

Referring to FIGURES 1–3 inclusive, the formation and structural features of a new capacitor according to the invention will be described. Several unfired or green thin films 10, illustrated as only five in number in FIGURE 1 for clarity, are first formed. These films contain a large quantity, usually over about 80 or 85% by weight of finely-divided inorganic particles which on firing in a conventional ceramic art manner become unified or sintered into a solid layer mass of ceramic. The films also contain a heat-volatile temporary organic binder material which holds the discrete inorganic particles together during processing of the green films preliminary to firing or sintering. Unfired or green ceramic films as here described are well known; and the illustrative teaching of such films as set forth in United States Patent No. 2,966,719, issued May 3, 1961 is here incorporated by reference.

These thin films are first provided with a pattern of holes 11, illustrated as square holes in FIGURE 1. Each film has an upper planar surface and a lower planar surface as well as edge surfaces 12 about the perimeter thereof and edge surfaces 13 about the holes 11. Edge surfaces 13 in fact define the limits of holes 11. It is essential to have preformed edge surfaces 12 or 13 extending approximately perpendicularly to the planar surfaces of the films 10.

On the upper planar surface of films 10b, 10c, 10d, and 10e, and suitably also on the lower planar surface of films 10a, 10b, 10c and 10d (one less than the total number of films employed in making a capacitor), is applied a thin coating of material in a pattern 14. As illustrated, this pattern is repeated four times on each surface since the illustration here discussed will be used to form four separate multilayer capacitors.

The coating 14 is of material which on firing to elevated temperatures conventional for ceramics is converted into an electrically-conductive metallic substance. Organic binder constituents are normally present in this coating; but they are heat volatilizable. The coating forms the interleaved electrodes in the final article and is suitably applied by well-known techniques in the capacitor industry, as by screening. The pattern of the area of the coating, however, is preferably (and essentially so where an external electrode is present and contact to an interleaved metal electrode layer is to be avoided) maintained within a predetermined area shown illustratively by dash lines 15 which define the cut-out area for one capacitor to be taken from the laminate.

It is important in this embodiment to apply the material of coating 14 so that the pattern applied extends from the electrode area 14 over a preformed edge surface 13 of a hole 11 so as to form an edge overlap structure 16. The edge overlap structure 16 consists of the material of the electrode pattern 14 overlapping a preformed edge surface 13 which remains as an edge surface of a lamination (i.e., electrically-insulative layer) in the final article. The overlap structure 16 is in the nature of an overflow about the edge of the preformed hole 11; and the edge overlap structure 16 is connected or unified with the electrode pattern 14 either directly or through a tab extension 17 off one side of the electrode pattern 14.

Observe that the edge overlap structure 16 for the coating areas 14 on the upper surface of films 10c and 10e extends off coating areas 14 in a direction opposite to the direction that overlap structure extends off of coating areas 14 on the upper surface of films 10b and 10d. But the overlap structures 18 for the coating areas (not shown) on the under surface or lower surface of films 10b and 10d extends off those lower surface coating areas in the same direction as the overlap structures 16 on the upper surface of films 10c and 10e. In like manner the overlap structures off coating areas (not shown) on the under side of films 10a and 10c extend off those coating areas in the same direction as the overlap structures off the coating area 14 on the upper surface of 10b and 10d. Thus when the laminate is stacked and pressed together, coating areas on the under and upper surfaces, as well as their tabs 17 and edge overlap structures 16 or 18, are in registration, or face to face relationship. Here it should be emphasized that, if desired, a single surface of films 10 may be coated with material to form an electrode and edge overlap structure connected therewith; but preferred results are gained by coating both internal surfaces of the films 10.

After the coated films 10 are stacked in registration and pressed together, normally at pressures up to about 5,000 pounds per square inch, individual multilayer segments to form capacitors are cut therefrom along the dash lines 15. One such multilayer article is illustrated in FIGURES 2 and 3. The article is then heated to unify it; and this is done for about 15 minutes to about 24 hours at temperatures up to about 300° C. sufficient to soften the organic binder material in different layers and cause the same to merge the layers of the structure together. Heating at this point is done without causing any substantial amounts of organic binder to volatilize. Then the article is sintered at ceramic firing temperatures, normally about 1000° C. up to about 1500° C. or possibly even higher. This step causes organic constituents to volatilize and the article to become a solid multilayer monolithic structure.

The fired article then contains electrically-insulative ceramic material 10 and electrically-conductive material 21 in alternate layer relationship. At least two, and preferably all functional dielectric electrically-insulative layers are ceramic dielectric layers between about 0.5 and 10 or 20 mils (12 and 250 or 500 microns) thick. They have a dielectric ceramic composition which is not a mere oxide of metallic material of electrically-conductive layers adjacent thereto. Electrically-conductive layers 21 are no more than 10 microns in thickness. They are in the form of electrode patterns of oxidation-resistant metallic conductive material. At least two, and preferably at least half or even all, of the electrode patterns have the metallic conductive material thereof extending therefrom and forming an edge overlap structure 16, with or without a matted edge overlap structure 18 paired therewith. Each edge overlap structure 16 consists essentially of the material of the electrode pattern 21 overlapping a preformed edge surface 13 of at least one electrically-insulative layer 10 adjacent the electrode pattern 21. The overlap structure 16 thus is oriented approximtely perpendicularly to the layer orientation of the electrode pattern 21 with which the edge overlap structure is unified. It is pertinent that the edge overlap structure extends on and over the preformed side 13 of the adjacent insulative layer 10 a distance which is at least one-fifth the thickness of the preformed edge 13 or a distance at least about 15 microns. The edge overlap may extend the entire thickness of preformed edge 13.

Terminal electrodes 22 and 23, also of electrically-conductive metallic material may take the form of small strip areas of metallic material. Each is applied to pass transversely across edge-surfaces of the lamination. Electrode 22 is in complete positive or full electrical contact with at least a part of edge overlap structures 16 and 18 to the left in FIGURE 3; and electrode 23 is in like connection or contact with edge overlap structures 16 and 18 to the right in FIGURE 3. Of significance is the fact that electrodes 22 and 23 may be very narrow, e.g. 0.035 inch, and extend to the top surface of the capacitor to form a connecting tab for soldered wire connections.

In FIGURES 4 and 5 a special "three-layer" capacitor is illustrated, having three electrically-insulative dielectric ceramic layers 30, 31 and 32, with two interleaved electrically-conductive layers 33 and 34. Terminal electrode 35 is on the upper surface of the article, and terminal electrode 36 is on its lower surface. At least two of the insulative or dielectric layers, usually 30 and 32, are between 0.5 and 10 mils thick. The center layer 31 may be as thick as 30 mils, but preferably is below about 10 mils thick. Conductive layers 33 and 34 are no more than about 10 microns thick, and normally at least about one micron thick. Means such as recess holes 37 and 38 are adapted to receive terminal electrode connections to interleaved electrode patterns 33 and 34 in the article.

Recess hole 37 extends from the outer planar surface of the upper outermost electrically-insulative layer 30 through that layer and through the center or next succeeding adjacent electrically-insulative layer 31, but not through all of the electrically-insulative layers of the article. Specifically, the recess hole 37 does not extend through electrically-insulative layer 32, the bottommost electrically-insulative layer of the article in FIGURES 4 and 5.

In like manner, recess hole 38 extends from the outermost planar surface of the lower outermost electrically-insulative layer 32 through that layer and through the center or next succeeding adjacent electrically-insulative layer 31, but not through all of the electrically-insulative layers of the article. Specifically, recess hole 38 terminates after it extends through the dielectric layer 31 and does not extend through insulative layer 30. Observe that interleaved internal electrode patterns 33 and 34 are each adjacent a surface of an electrically-insulative layer at the bottom of a recess hole 38 and 37, respectively. Those internal electrodes extend continuously across the area limits of the recess hole termination. In other words, internal electrodes 33 and 34 extend continuously over the bottom or innermost extremity of recess holes 38 and 37 respectively.

Further, internal electrode pattern 33, in the area thereof near recess hole 37, is insulatively spaced from the surface or the limits of recess hole 37. This is accomplished simply by not coating a ring area 39 about recess hole 37 with electrode material. Normally this is easily accomplished by placing a masking disc over the hole of an insulative layer during application of coating material to form the electrode prior to stacking the layers of the laminate article. In cases where recess hole 37 is punched or formed in insulative layers 30 and 31 after internal electrode pattern 33 is formed, the punching of the hole to form recess hole 37 will be centered within a circular noncoated area located within expanse of the area of electrode 33.

Similarly, internal electrode 34 is insulatively spaced as at numeral 40 from the internal surface or limits of recess hole 38 so as to prevent terminal electrode 36 from connecting to the insulatively spaced electrode pattern 34 at that recess hole.

In FIGURE 5, an edge overlap structure 41 extends perpendicularly from internal electrode 33 along a preformed edge surface (i.e., edge of hole 38) of insulative layer 31; and an edge overlap structure 42 extends perpendicularly from the internal electrode 34 along the preformed edge surface (i.e., edge of hole 37) in insulative layer 31. These edge overlap structures are unnecessary in a three-layer structure such as illustrated in FIGURES 4 and 5, because a positive electrical contact between electrode materials 35 and 36 is obtained simply by allowing the material of those electrodes to flow into and occupy holes 37 and 38, either as a complete filling of those holes or a coating thereof extending to the outer terminal electrode surface layers. For example, electrode material 43 at the bottom of recess hole 37 is in contact with internal electrode 34 across the area limits of the recess hole 37 termination; and electrode material 44 at the bottom of recess hole 38 is in contact with internal electrode 33 across the area limits of the recess hole 38 termination.

The article of FIGURES 6 and 7 is similar to the article of FIGURES 4 and 5, but has additional electrically-insulative layers, specifically five numbered 50, 51, 52, 53 and 54. FIGURE 7 illustrates, among other things, the principles by which electrical connection from a terminal electrode mass to several interleaved electrodes in a multilayer article may be accomplished within a recess hole. Articles of the type shown in FIGURES 6 and 7 may be formed to have any suitable number of electrically-insulative layers, with varied interleaved internal electrode patterns.

These articles have more than three electrically-insulative layers with interleaved internal electrodes between the same. For sound electrical connection between a terminal electrode in a recess hole and an interleaved internal electrode pattern between insulative layers through which that recess hole passes, an edge overlap structure 45 in recess hole 46 in FIGURE 7 is provided. Specifically, internal electrode 58 in FIGURE 7 is provided with the edge overlap structure 45 over the preformed edge surface of one or both insulating layers 52 and 53 in recess hole 46 to gain connection with terminal electrode 48. Material of terminal electrode 48 extends into recess hole 46 to cover the sides thereof and bottom or terminal portion thereof as a coating 49.

Internal electrode 56 in FIGURE 7 extends continuously across the bottom or terminal limits of recess hole 46; and this presents a large surface for positive electrical connection with mass 49 of electrode 48 in the recess hole 46 without need for an edge overlap structure at that point. Of course, an edge overlap structure may be formed at that point; and an edge overlap structure 55, of the type having the characteristics described for such structures in FIGURES 1–3 inclusive, is illustrated as being present in FIGURE 7. Generally, where interleaved internal electrodes bordering along the length and not the terminus of a recess hole are to be electrically connected with a terminal electrode mass in a recess hole, they will be provided with edge overlap structures to insure full electrical connection; but in some cases such improved connections may be sacrificed.

The article of FIGURES 6 and 7 contains two capacitors with a common terminal electrode 48 electrically connected with interleaved internal electrodes 56 and 58. One capacitor has a half-moon electrode 60 on the surface of the multilayer structure opposite the common terminal electrode 48; and the other capacitor to the left in the drawing has a half-moon terminal electrode 62 located on the same external face of the laminate as terminal electrode 60. Terminal electrode 60 is in electrical connection with interleaved interior electrode 57 since mass of terminal electrode 60 extends into and along the side of recess hole 61 to the bottom terminus thereof in contact with interleaved electrode 57 at the lower terminus of recess hole 61. The terminal electrode 62 for the other capacitor is electrically connected with interleaved electrode 59 because mass from terminal electrode 62 extends into and along the side of hole 63 to bottom terminus thereof in contact with interleaved electrode 59 which extends continuously across the bottom or terminus of hole 63. Varied over-all design configurations are possible for articles of this type while retaining dual capacitance function but varying the capacitance of one capacitor with respect to the other and the degree or extent of interdependence thereof.

It should be observed that the recess holes in the articles of FIGURES 4–7 inclusive are laterally displaced or spaced from each other and oriented approximately parallel with each other. Generally all of the insulative layers 50–54 inclusive of FIGURE 7 will not exceed 10 mils (250 microns) in thickness. However, some insulative layers in multilayer articles may perform support functions or isolation functions or the like, and be as thick as 40 mils or even more.

In FIGURES 8, 9 and 10, directed to a monolithic article containing a portion of a complex electronic circuit, a series of eleven electrically-insulative layers or films 71 to 81 inclusive are employed. This article has eight terminal electrodes 82 to 89 inclusive. Each terminal electrode is a coating of metal substance on the interior of passages (cylindrical in nature) and on the lip portion or ring area at the opening of the passages. Each passage extends completely through the several layers of the multilayer article from the outer surface of the uppermost outer insulative layer 71 to the outer surface of the lowermost outer insulative layer 81. The electrode metal of terminal electrodes extends as a hollow coating in these passages. Electrodes are adapted to receive wire connections. For example, a wire may be placed partially in the hollow interior of a terminal electrode and then soldered in position to form a lead.

Under the outermost insulative layer 71 is an interleaved electrode pattern 90 shown by dash lines in FIGURE 8 and shown to be connected to terminal electrode 88. Each of the other internal or interleaved electrode layers 96, 97, 98, 99, and 100 are connected in a similar manner to the following electrodes, respectively, 87, 82, 89, 84, 86. All internal electrodes have an edge overlap structure of the type characterized in discussing FIGURES 1–3 inclusive (e.g., edge overlap structure 102 from internal electrode 98).

Referring to FIGURE 9, a resistor element 91 is shown connected between terminals 87 and 89 by means of conductive paths 92 and 93 respectively. Such resistors may be made by screen coating any one of a variety of commercially available resistor paste compositions and heat-treating the coating to cure it to form a stabilized resistor. A recess hole 101 through outer layer 81 provides a space for the addition of a circuit element to be connected electrically to a conductive metal path 95 between layers 80 and 81. Path 95 extends from hole 101 to terminal electrode 85, and terminates in an edge overlap structure 103. Conductive path 94 on the outer surface of insulative layer 81 extends from terminal 83 to or around the lateral outer edge surfaces of hole 101. The added circuit element, suitably in the form of a diode, transistor or the like, may be placed in hole 101 and electrically connected to external conductive path 94 and to the internal conductive path 95.

A capacitor is formed by insulative layer 72 with electrodes 90 and 96. Layer 73 with internal electrodes 96 and 97 forms an additional capacitor, having an electrode common with the first mentioned capacitor and a lower capacitance than the first mentioned capacitor when the same dielectric insulative material and layer thickness for layers 72 and 73 is employed.

Layer 75 has substantial void holes at least in the area underlying the electrode areas 96 and 97. That layer plus insulative layers 74 and 76 and with no electrically-conductive metal between any two of these layers provides an isolation arrangement which separates electrical circuit elements above it from those below it and reduces capacitive coupling between such circuit elements. Alternately, an isolation arrangement may be gained by using relatively thicker, e.g., about 20 to 40 mils or more, insulative layers having a dielectric constant below that of layers of electrically-insulative material adjacent the isolation arrangement.

Internal electrode 98 together with internal electrode 99 form a capacitor with insulative layer 77 serving as the dielectric. Internal electrode 99 also serves as an electrode with electrode 100 for a capacitor with insulative layer 78 as the dielectric.

Preferably, dielectric layers 74, 75, 76, 79, 80, and 81 are made of an insulative material having a lower dielectric constant than that of layers 72, 73, 77 and 78 which serve as capacitor dielectrics. The lower dielectric constant of layers 79, 80 and 81 serves to help reduce undesirable capacitive coupling between conductive areas 92, 94 and underlying electrode area 100.

Compacted portions of electronic circuits as illustrated in FIGURES 8–10 inclusive are particularly useful, as are the other teachings hereof, in making computers even smaller and more reliable.

The trimmer capacitor element of FIGURE 11, shown in cross section at the lower part 104 of FIGURE 12, has a layer mass of electrically-insulative ceramic material 105. This layer mass 105 is illustrated as being formed from a plurality of thinner layers of material merged together to form the mass 105. The mass should be between about 5 and 50 mils thick. It has a bore hole 106 through it from its upper to its lower faces or surfaces. Oriented next to mass 105 is a dielectric electrically-insulative ceramic layer 107 between about 2 and 10 mils thick, and at least thinner than half the thickness of layer mass 105. The dielectric layer 107 has approximately the same planar area as the layer mass 105. Also, the dielectric layer 107 has a bore hole 108 through it from its upper to lower face. Electrically-insulative layers 105 and 107 are oriented with respect to each other so that the bore holes through each form of continuous bore hole through the capacitor element.

Between layer mass 105 and film 107 is an electrode pattern 109 no more than about 10 microns thick. The electrode pattern is formed of oxidation-resistant metallic conductive material, suitably a material containing a noble metal such as platinum, or palladium, or alloys of platinum or palladium. This electrode pattern is insulatively-spaced, as at numeral 110, from the perimeter extremities of the internal planes of the electrically-insulative layers 105 and 107. The electrode material 109 extends to form an edge overlap structure 111, as previously described, within the bore 108 of the capacitor element. The preformed bore hole of either the layer mass 105 or the dielectric layer 107, or both, may have an edge overlap structure. At least one edge overlap extends to cover a distance of at least 20 microns on a preformed edge surface of a bore hole.

Preferably the trimmer capacitor element of FIGURE 11 and part of FIGURE 12 is approximately circular or disc-like in configuration and has the bore hole located approximately in its center. Also, its internal electrode 109 is preferably approximately half-moon in shape.

In FIGURE 12, a crude sketch, partially in cross-section, of a complete trimmer capacitor is presented. As there shown, a conductive support rod 112 extends through the bore hole of the capacitor element comprising layers 105 and 107 and is non-movably affixed within the bore hole. It is in electrical connection with edge overlap structure 111, suitably with an intervening metal coat (not shown) to bond the conductive rod 112 into positive or complete electrical connection with the edge overlap structure.

Above the dielectric layer 107 is a disc member 113 which in essential respects is merely a support ring for electrode 114. Electrode 114 is firmly united with support ring 113, and also is preferably of half-moon design. Ring 114 is not affixed to shaft or rod 112, and is rotatable with respect thereto. Normally ring 114 is rigidly fixed to other elements of structure. It is held against the face of dielectric 107 by spring 115 about shaft 112 between head 116 and the surface of ring 113.

Change of capacitance for the trimmer capacitor is accomplished by placing a screw in slotted member 117 (which is immovably affixed to shaft 112 and layers 107 and 105) and turning the lower part of the trimmer capacitor to adjust the position of its electrode area 109 with respect to the upper ring member's electrode area 114.

Ordinarily the number of electrically-insulative layers in articles formed according to the teachings hereof will be at least three in number and no more than 22 in number, although a greater number is possible. However, the principles of the invention are also useful in forming capacitors having only two electrically-insulative layers with recess hole terminal electrode connection, as described, for an interior electroded area.

A variety of different compositions may be employed for the various layers of the articles. Also, layers or elements having a composition uncommon in the ceramic art may be added to the articles of the invention for various purposes. The exact nature of the compositions employed is not the critical part of the instant invention in that composition plays a part only in the general sense that useful compositions must be employed in order to gain useful results.

Ordinarily, the electrically-insulative ceramic layers of the articles will have a composition which exhibits a dielectric constant of at least about 15. However, ceramic layers of lower dielectric constant may be present, particularly to gain an isolation arrangement or function. Many known ceramic compositions are useful in forming electrically-insulative layers for articles of the invention. Probably the most preferred presently known ceramic dielectric compositions are those containing at least some titania, frequently in alkaline earth titanate form and frequently with a small amount of modifier material such as bismuth stannate.

The temporary organic film-forming burn-out binders for finely-divided inorganic particulate in a film or layer may comprise synthetic organic resins, wetting agents and plasticizers, as well known in the ceramic art. These materials are selected not only for their property of holding ceramic particulate together in a green film or layer state, but also for their ready burn-out properties on firing. They preferably are thermoplastic as distinguished from thermosetting in nature.

The formation of electrically-conductive layers in the articles hereof is normally accomplished by applying directly upon surfaces of a green ceramic particulate a coating of metal particulate material in the pattern desired for electrical conduction. Many different electrically-conductive metals in particulate form, or compositions convertible by heat to electrically-conductive metals, may be used in forming the electrically-conductive electrode patterns. If desired, foils or vapor deposits of metal in the electrically-conductive patterns may be employed. Illustratively, the metallic electrically-conductive electrode patterns or areas may be applied as a coating of finely-divided metal powder particles suspended in a heat volatile binder for the particles and volatile solvent material for the binder to reduce the viscosity to a coatable consistency. Frequently screen processing of the metallic pattern is employed. Some useful illustrative compositions, frequently referred to as metal paste compositions, are commercially available platinum pastes and palladium pastes marketed by the E. I. du Pont de Nemours & Co., such as platinum paste No. 7698 of Du Pont (a finely-divided platinum composition suspended at about 42% by weight in an organic heat volatile binder and solvent therefor), or palladium paste No. 6587 (about 42 weight percent of finely-divided palladium suspended in an organic heat volatile binder and solvent therefor). The metal paste should either contain the metal in finely-divided form or a compound of the metal which decomposes on firing or sintering of the article to form the free metal for electrical conduction. Further, the organic material in useful metal paste compositions should behave to volatilize on heating under the firing conditions employed in sintering the monolithic articles. Normally the metal paste composition will be applied at a thickness to provide a final thickness of the coating between about 1 and 10 microns, preferably at least 2 and not over about 5 microns thick.

Internal electrode areas or patterns and their edge overlap structures are normally formed of compositions which contain at least some noble metal such as platinum, palladium or alloys thereof. For the terminal electrodes to which wire leads are frequently soldered, compositions containing a noble metal are also useful. Specifically platinum-gold or palladium-gold may be useful. Also, terminals frequently are formed of silver metal compounds, or gold. Depending upon the application technique (e.g. photoresist procedure), copper or nickel metal compounds also may be employed. These compounds all accept normal solder metals to form a sound electrical connection.

The following specific examples are offered as illustrative of the invention.

*Example 1*

This example particularly illustrates a multilayer capacitor having twelve electrically-insulative layers but otherwise formed and having the features of the embodiment of the invention illustrated in FIGURES 1 through 3, inclusive. The dry unfired or green films of inorganic ceramic dielectric particles and organic binder employed as starting material were formed by a slip coating procedure as taught in United States Patent No. 2,966,719 using a dielectric composition as taught in United States Patent No. 2,908,579. They were about 6.8 mils (170 microns) thick and had the following calculated composition by weight: 50.8 parts barium oxide, 26.4 parts titanium oxide, 5.2 parts bismuth oxide, 5.3 parts tin oxide, 7.0 parts polyvinyl butyral, and 5.3 triethylene glycol hexoate plasticizer for the resin.

Square holes 11 were punched in each film in the pattern illustrated in FIGURE 1. The space between adjacent holes was about 0.278 inch in both directions. Hole dimensions were about 0.0228 inch in both dimensions.

Material to form the electrically-conductive patterns was then applied to both sides of the several layers with alternate positioning of edge overlap structures in the manner illustrated in FIGURE 1. The specific material applied to form the electrically-conductive coatings was a platinum paste containing about 55% by weight of finely-divided platinum in a heat volatile organic thermoplastic binder and sufficient organic solvent for the organic binder to convert the material to a coatable consistency. It was screened as a coating on both the upper and lower surfaces (except the external surfaces of the outermost layers) at a thickness sufficient to give a total fired electrode layer between insulative layers (free of organic constituents) having a thickness of about 2.5 microns. The screen-applied coating flowed over the preformed edges of the punched squares.

Solvent was then evaporated from the coatings by heating to about 90° C. The layers were assembled into a laminate between platens under a pressure of about 4,000 pounds per square inch. Prior to this step, each layer was registered on top of underlying layers so that the preformed holes were in alignment, and the coatings in registration.

It is to be observed that interior electrode layers are in part insulatively spaced from at least a portion of the edge surfaces of electrically-insulative layers adjacent thereto in the laminate so as to remain insulatively spaced from any terminal electrodes as may be attached to traverse across such portion. This is generally characteristic of alternate electrode layers at the edge of the lamination where terminal electrodes are to be applied.

Then individual structures were punched from the laminate as illustratively shown along the dotted lines 15 in FIGURE 1 to form individual capacitor arrangements as illustrated in FIGURES 2 and 3. Each laminate was then heated to 235° C. for about 1½ hours to soften the organic binder and unify the several layers. Then the article was sintered in an oxidizing atmosphere at a temperature of 1320° C., maintained for approximately one hour at approximately the middle of an 8-hour firing cycle.

Examination of the sintered article in the area of the original precut or preformed edges of squares where the edge overlap structure was formed showed that in most cases the noble metal forming the edge overlap structure remained adherent to the precut edge. A substantial area (about one-half the thickness of an electrically-insulative ceramic layer employed) was covered by the edge overlap structure of the platinum. It remained parallel to the preformed edges of the electrically-insulated ceramic layers. In a few cases, the platinum had pulled itself away from the ceramic layer along the preformed edge but remained in complete integrity or unification with the tab connection to the interleaved electrodes in the laminate and formed an essentially curved extension; but again the edge overlap structure, even though slightly spaced in a few cases from the preformed edge of an adjacent electrically-insulative layer, was oriented approximately perpendicularly to the layer orientation of the electrode pattern with which it remained unified.

The capacitor articles of this example had top area dimensions of about .212 inch by .184 inch. Their thickness was about .060 inch. Firing causes some shrinkage, about 28 to 31%. Electrodes 22 and 23 added only slightly to the mass in the limited areas occupied by the electrodes. The specific material used to form the electrodes was Du Pont silver paste No. 6730 comprising silver flake particles, up to about 10% by weight of glass frit material, and heat volatile thermoplastic organic binder material together with a solvent for the binder to reduce the viscosity for coating. Electrodes 22 and 23 suitably are extremely narrow, e.g., .035 inch, and may be extended over the top surface to form a connecting tab for soldered wire connections. The silver electrodes are fired at 800° C. for about 10 minutes in the middle of a 90 minute firing cycle.

Capacitance of 20 consecutive parts formed according to this example was found to be 15,745 picofarads, at 1 kilocycle and up to 5 volts RMS. None of the 20 consecutive parts varied more than 2.6 percent from this capacitance value.

*Example 2*

Example 1 was duplicated using, however, dry unfired films of inorganic ceramic dielectric particulate and organic binder having the following composition by weight: 52.8 parts lanthanum oxide, 30.1 parts titanium dioxide, 2.4 parts magnesium oxide, about 3.9 parts unidentified other rare earth oxides (present as impurities in commercially purchased lanthanum carbonate from which the lanthanum oxide was formed), 6.2 parts polyvinyl butyral thermoplastic resin, and 4.6 parts of triethylene glycol hexoate as a plasticizer for the resin. The unfired films were about 4.5 mils thick.

The fired multilayer articles measured about .227 x .197 x .039 inch. Silver terminal electrodes were applied and the capacitance measured as in Example 1. The average capacitance of consecutive parts was 760 picofarads. The minimum value was 734 picofarads, and the maximum value was 823 picofarads. Then ten capacitors were subjected to five amperes for five minutes at 14.26 megacycles. The maximum change in capacitance detected was an increase of 8.4 picofarads, which is about one percent.

Using the same dielectric ceramic composition and internal interleaved electrode composition and terminal electrode composition as in this Example 2, multilayer capacitors of essentially the same dimensions as above described were formed by the prior art method of cutting through the lamination to gain exposure of line edges of interleaved electrodes for attachment of terminal electrodes. The test results under identical conditions resulted in capacitance values for 26 articles varying from 580 picofarads to 800 picofarads, with 8 capacitors out of the 26 having a capacitance no higher than 640 picofarads. This illustrates the spread of results obtained using prior art teachings, and the lack of predictable results.

*Example 3*

The article of FIGURES 4 and 5 was formed using unfired films of inorganic material having the same composition as set forth in Example 1. These films were 3.8 mils thick. Three layers of the film were used and ultimately formed into discs approximately .315 inch in diameter. The center layer was punched with two holes each approximately .030 inch in diameter and spaced about 0.05 inch from the center of the disc configuration. One hole .030 inch in diameter was centered and punched through the other two discs at a distance of 0.05 inch from the center of the discs.

A screen was prepared having an opening .280 inch in diameter except for a masked area .065 inch in diameter which was centered at a distance of .050 inch from the geometric center of the opening. This screen was used to apply platinum paste at a thickness as described in Example 1 in patterns on surfaces of the unfired films located internally in the final article. Each internal surface of outer layers 30 and 32 was screened with the .065 diameter masked area centered over the .030 inch hole in that layer, so that an insulative band about 0.175 inch in width extended about the hole. The center layer 31 was screened with metal paste so that one hole on one side, and the other hole on the other side thereof, had an insulative band provided thereabout. The other hole on each side was coated down its internal edge surfaces with a spillover of the metal paste. The three layers were then assembled as shown in FIGURES 4 and 5 with the holes of the outer layers in registration with the hole on the inner layer 31 whose surface presented an insulative band to coincide with that of the outer layer. In effect, the patterns of metal paste were joined together in face to face relationship in forming the layer laminate illustrated in FIGURES 4 and 5. Then, when not done earlier, the assembly of the three layers is sheared about its outer edges to a final shape having a diameter of about .315 inch concentric with the .280 inch diameter of the internal interleaved electrode areas 33 and 34. The laminated structure was pressed together at a pressure of about 4,000 pounds per square inch. Then the article was heat treated as in Example 1 and sintered according to the procedure illustrated in that example.

The resulting sintered three-layer disc measured .24 inch in diameter by about .0078 inch in thickness.

Silver paste was applied to both faces by screening, and fired as in Example 1. It was applied in a .22 inch diameter pattern; and additional silver paste was applied in each recess hole 37 and 38 to be certain that the silver electrodes 35 and 36 made good electrical contact to the platinum electrode material at the bottom of the holes 37 and 38.

The disc capacitors of this example had an average capacitance value of about 13,942 picofarads. Although these disc capacitors were only .0078 inch in thickness, they appeared to be as strong physically as conventional ceramic discs (not multilayer) about .010 or .011 inch in thickness. The thin metal electrode layers appeared to add strength to the article. The dielectric strength of these articles was about 1720 volts DC, or about 660 volts DC per mil of dielectric thickness.

That which is claimed is:

1. A multilayer monolithic sinter-unified electronic article comprising at least one capacitor formed of electrically-insulative and interleaved electrically-conductive materials in alternate layer relationship, with layers of said interleaved electrically-conductive material being of smaller area than and covering less than the surface area of immediately adjacent layers of said electrically-insulative material, and with contacting surface areas of said layers of electrically-insulative material sinter-unified to each other in those surface areas which are free of said electrically-conductive material (i) said electrically-insulative layers having opposite planar surfaces and edge surfaces approximately perpendicular to said planar surfaces, at least two of said electrically-insulative layers being ceramic between about 0.5 and 10 mils thicks and having a dielectric ceramic composition which is not a mere oxide of metallic material of electrically-conductive layers adjacent thereto, (ii) said electrically-conductive layers being no more than about 10 microns thick and in the form of electrode patterns of oxidation-resistant metallic conductive material, each of at least two of said electrode patterns having the metallic conductive material thereof extending therefrom and forming an edge overlap structure which is sinter-unified to a ceramic electrically-insulative layer, each said edge overlap structure consisting essentially of the material of said electrode pattern overlapping a preformed edge surface of at least one said ceramic electrically-insulative layer adjacent the electrode pattern such that the overlap structure is oriented approximately perpendicularly to the layer orientation of the electrode pattern with which it is unified and extends to cover a distance on said preformed edge surface at least one-fifth the thickness of said surface up to the entire thickness thereof, and (iii) at least two terminal electrodes attached to said element and traversing across edge surfaces of said electrically insulative layers, one of said terminal electrodes being connected electrically to at least one said edge overlap structure.

2. The electronic article of claim 1 having, in addition, a further capacitor formed by adding a further terminal electrode to the electronic article, said further terminal electrode being connected electrically to an edge overlap structure free of electrical connection to other terminal electrodes.

3. The electronic article of claim 1 having (i) one or more recess holes extending from the outer planar surface of an outermost electrically-insulative layer through said outermost electrically-insulative layer and optionally through one or more succeeding adjacent electrically-insulative layers, and (ii) electrically-conductive means between electrically-insulative layer surfaces bordering said holes and providing electrical contact for conductive material placed in said holes.

4. The electronic article of claim 3 having electrical terminals comprising conductive metallic material extending into said recess holes and in physical unification with said electrically-conductive means.

5. The electronic article of claim 1 in which said edge overlap structures consist essentially of the material of an electrode pattern overlapping a preformed edge surface of both electrically-insulative layers adjacent the electrode pattern.

6. The electronic article of claim 1 having at least three electrically-insulative layers and no more than 22 of such layers, at least two-thirds of said layers being no more than about 10 mils thick, and in which the preformed edge surface over which material of the electrode pattern forms the edge overlap structure is formed by a hole through the adjacent electrically-insulative layer.

7. The electronic article of claim 1 in which each electrode pattern of a capacitor has the metallic conductive material thereof extending therefrom and forming an edge overlap structure as defined in claim 1.

8. The electronic article of claim 1 in which the oxidation-resistant metallic conductive material is insulatively spaced from at least a portion of the edge surfaces of electrically-insulative layers adjacent thereto so as to remain insulatively spaced from any electrical terminals as may be attached to traverse across said portion.

9. A multilayer sinter-unified monolithic electronic article comprising at least one capacitor and at least three stacked electrically-insulative layers with at least two electrically-conductive layers in the form of electrode patterns of oxidation-resistant metallic conductive material, each electrode pattern being no more than about 10 microns thick and located between adjacent electrically-insulative layers, said electrically-insulative layers having opposite planar surfaces and edge surfaces approximately perpendicular to said planar surfaces, at least two of said electrically-insulative layers being between about 0.5 and 10 mils thick and having a ceramic composition which is not a mere oxide of metallic material in electrically-conductive layers adjacent thereto, first means to receive a first terminal electrode connection to at least one electrode pattern of said element, and second means to receive a second terminal electrode connection to at least one electrode pattern not connected to said first means, at least one of said first and second means comprising a recess hole extending from the outer planar surface of an outermost electrically-insulative layer through said outermost electrically-insulative layer and through at least one succeeding adjacent electrically-insulative layer but not through all of the electrically-insulative layers of said article, the electrode pattern on the surface of the electrically-insulative layer at which said recess hole terminates being continuously across the area limits of said recess hole termination, and at least one electrode pattern between electrically-insulative layers through which said recess hole extends being insulatively-spaced from the limits of said recess hole where terminal electrode connection to said insulatively-spaced electrode pattern is to be avoided, said electrically-insulative layers adjacent said last mentioned electrode pattern having their surfaces in contact and sinter-unified in the portions thereof free of said last mentioned electrode pattern.

10. The multilayer sinter-unified monolithic electronic article of claim 9 having at least two capacitors and having, in addition to the first and second means to receive a first and second terminal electrode connection, a third means to receive a third terminal electrode connection to at least one electrode pattern of said article not connected to said first and second means, each one of said first, second and third means being characterized by comprising a recess hole extending from an outer planar surface of an outermost electrically-insulative layer through said outermost electrically-insulative layer and through at least one succeeding adjacent electrically-insulative layer, but not through all of said electrically-insulative layers of said element, each said recess hole being laterally displaced from the other recess holes and oriented approximately parallel therewith, two of said means to receive a terminal electrode connection being on the same external surface of an outermost electrically-insulative layer in said article, the remaining means to receive a terminal electrode connection being on the outer surface of an oppositely-located outermost electrically-insulative layer and being adapted to receive a terminal electrode connection serving said two capacitors in said element.

11. The multilayer element of claim 9 in which at least one electrode pattern has the metallic conductive material thereof extending therefrom and forming an edge overlap structure consisting essentially of said material overlapping the preformed edge surface of a recess hole through at least one electrically-insulative layer adjacent said electrode pattern such that the overlap structure is oriented approximately perpendicularly to the layer orientation of the electrode pattern with which it is unified and extends to cover a distance on said preformed edge surface at least one-fifth the thickness of said surface up to the entire thickness thereof.

12. A multilayer sinter-unified monolithic capacitor comprising three electrically-insulating dielectric ceramic layers, at least the two outermost ceramic layers of said capacitor being about 0.5 mil to 10 mils thick and the other ceramic layer being a center layer no more than 30 mils thick, two internal electrically-conductive layers no greater than 10 microns thick in the form of electrode patterns spaced from each other by said center ceramic layer, two recess holes, one on each external ceramic layer, each said recess hole being characterized by extending from an exterior surface of an outermost ceramic layer through said outermost ceramic layer and through the center ceramic layer but not through the opposite outermost ceramic layer, said recess holes being displaced laterally from each other in said capacitor so as to be separated from each other in said capacitor, a terminal electrode on the external surface of each outermost ceramic layer, each said terminal electrode having material thereof extending into and coating surfaces of a recess hole, the electrode patterns of said internally conductive layers of said capacitor being characterized by extending continuously across the area limits of the termination of each recess hole on the interior surface of the outermost ceramic layers such that positive electrical connection is established with electrode material in each recess hole, and the electrode patterns in those areas between ceramic layers penetrated by a recess hole being insulatively-spaced from the limits of the recess hole, with adjacent contacting portions of said electrically-insulative layers not covered by an electrode pattern sintered together.

13. A monolithic capacitor article comprising a layer mass of electrically-insulative ceramic material between about 5 and 50 mils thick and having a bore hole therethrough from the upper to the lower surface, a dielectric electrically-insulative ceramic layer between about 2 and 10 mils thick and thinner than about half the thickness of said layer mass, said dielectric ceramic layer being of approximately the same planar area as said layer mass and also having a bore hole therethrough, said dielectric ceramic layer being oriented such that the bore hole through it and the bore hole of said layer mass form a continuous bore hole through said capacitor element, an electrode pattern no more than about 10 microns thick of oxidation-resistant metallic conductive material between said layer mass and said dielectric ceramic layer, said electrode pattern being insulatively-spaced from the perimeter extremities of the internal planes of the electrically-insulative material of said layer mass and said dielectric layer, said layers of electrically-insulative material being sintered together in the contacting portions thereof free of said electrode pattern and said electrode pattern having the conductive material thereof extending therefrom and forming an edge overlap structure within the bore of said capacitor element, said edge overlap structure consisting essentially of the material of said electrode pattern overlapping the preformed edge surface of the bore hole surface of at least one of said electrically-insulative adjacent layers such that the overlap structure is oriented approximately perpendicular to the layer orientation of said electrode with which it is unified and extends to cover a distance of at least 20 microns on said preformed edge surface but does not extend to cover the full depth of said preformed edge surface, said oxidation-resistant metallic conductive material comprising platinum, or palladium, or alloys of said platinum or palladium.

14. The capacitor article of claim 13 in the form of a trimmer capacitor element having a circular configuration for the layer mass and dielectric layer, having the bore hole through said layers located approximately in the center of the circular configuration thereof, and having an approximately half moon shape for said electrode pattern.

15. A capacitor comprising two layers of insulative ceramic dielectric material with electrically-conductive metal buried between said layers and not exposed at the peripheral edges of said layers, the first insulative layer being between about ½ and 10 mils thickness, the second insulative layer being thicker in that it is between about 2 and 20 mils thickness, and has a recess hole provided therethrough as a means of electrical contact to the conductive metal layer, and an external electrode area of metal covering substantially all of the outermost surface of the thinner insulative layer, said two layers of insulative ceramic material being sintered together in the contacting peripheral portions thereof free of said electrically-conductive metal.

16. A sintered article comprising a first layer of electrically-insulative ceramic material between about 0.5 and 10 mils thick and having at least one recess hole therethrough from the upper to the lower surface, a second electrically-insulative ceramic layer no greater than 30 mils thick and having approximately the same planar area as said first layer, at least one conductive metallic pattern no more than about 10 microns thick and located between said first and second ceramic layers to form a laminate-type structural article, said metallic pattern at least being such as to extend into the area limits of the termination of said recess hole a the interior surface of said first ceramic layer said metallic pattern being characterized by not occupying all adjacent surface portions of said first and second electrically-insulative ceramic layers and also by extending into and forming an edge overlap structure about said recess hole in said first layer of electrically-insulative ceramic material, such that positive electrical connection may be established with said internal conductive metallic pattern through said recess hole, and said first and second layers of electrically-insulative ceramic being sintered together in the adjacent surface areas thereof free of said metallic pattern.

17. The article of claim 16 having more than one recess hole through said first ceramic layer, with conductive metallic pattern at least extending into the area limits of termination of more than one of said recess holes at the interior surface of said first ceramic layer.

References Cited

UNITED STATES PATENTS

| | | | |
|---|---|---|---|
| 3,329,851 | 7/1967 | Braeutigam | 174—68.5 X |
| 2,437,212 | 3/1948 | Schottland | 317—261 |
| 3,021,589 | 2/1962 | Weller. | |
| 3,260,907 | 7/1966 | Weller et al. | 317—261 |
| 3,274,468 | 9/1966 | Rodriguez | 317—242 X |

FOREIGN PATENTS

| | | |
|---|---|---|
| 894,533 | 3/1944 | France. |
| 693,455 | 7/1953 | Great Britain. |

DARRELL L. CLAY, *Primary Examiner.*

LEWIS H. MYERS, *Examiner.*

E. GOLDBERG, *Assistant Examiner.*